(12) United States Patent
Helsloot et al.

(10) Patent No.: US 11,592,537 B2
(45) Date of Patent: Feb. 28, 2023

(54) OPTICAL CROSSTALK MITIGATION IN LIDAR USING DIGITAL SIGNAL PROCESSING

(71) Applicant: Infineon Technologies AG, Neubiberg (DE)

(72) Inventors: Michiel Helsloot, HD's-Hertogenbosch (NL); Wojciech Kudla, Wageningen (NL); Vladimir Petrovic, Eindhoven (NL)

(73) Assignee: Infineon Technologies AG, Neubiberg (DE)

( * ) Notice: Subject to any disclaimer, the term of this patent is extended or adjusted under 35 U.S.C. 154(b) by 842 days.

(21) Appl. No.: 16/524,576

(22) Filed: Jul. 29, 2019

(65) Prior Publication Data

US 2021/0033711 A1    Feb. 4, 2021

(51) Int. Cl.
   *G01S 7/48*      (2006.01)
   *G01S 17/42*     (2006.01)
   *G01S 7/487*     (2006.01)
   *G01S 7/4865*    (2020.01)
   *G01S 17/894*    (2020.01)
   *G01S 7/481*     (2006.01)

(52) U.S. Cl.
   CPC .......... *G01S 7/4876* (2013.01); *G01S 7/4817* (2013.01); *G01S 7/4865* (2013.01); *G01S 17/42* (2013.01); *G01S 17/894* (2020.01)

(58) Field of Classification Search
   USPC ........................................ 356/5.1
   See application file for complete search history.

(56) References Cited

U.S. PATENT DOCUMENTS

2019/0391270 A1*  12/2019  Uehara ............... G01S 17/04
2020/0284883 A1*  9/2020   Ferreira ............. G01S 7/4817

* cited by examiner

*Primary Examiner* — Mikhail Itskovich
(74) *Attorney, Agent, or Firm* — Harrity & Harrity, LLP

(57) ABSTRACT

A method of detecting optical crosstalk in a LIDAR system includes selectively activating and deactivating light sources of a light source array; triggering a measurement of the field of view (FOV) during which at least one targeted region of the FOV is illuminated by the light source array and at least one non-targeted region of the FOV is not illuminated by the light source array; generating electrical signals based on at least one reflected light beam being received by a photodetector array, where the photodetector array comprises a targeted pixel group corresponding to the at least one targeted region of the FOV and a non-targeted pixel group corresponding to the at least one non-targeted region of the FOV; and detecting optical crosstalk that appears at at least one portion of the non-targeted pixel group based on electrical signals from the targeted pixel group and the non-targeted pixel group.

26 Claims, 6 Drawing Sheets

OPTICAL CROSSTALK MITIGATION IN LIDAR USING DIGITAL SIGNAL PROCESSING

FIELD

The present disclosure relates generally to a device and to methods for mitigating optical crosstalk in a Light Detection and Ranging (LIDAR) system.

BACKGROUND

Light Detection and Ranging (LIDAR), is a remote sensing method that uses light in the form of a pulsed laser to measure ranges (variable distances) to one or more objects in a field of view. In particular, light is transmitted towards the object. Single photodetectors or arrays of photodetectors receive reflections from objects illuminated by the light, and the time it takes for the reflections to arrive at various sensors in the photodetector array is determined. This is also referred to as measuring time-of-flight (TOF). LIDAR systems form depth measurements and make distance measurements by mapping the distance to objects based on the time-of-flight computations. Thus, the time-of-flight computations can create distance and depth maps, which may be used to generate images.

LIDAR systems that use a one-dimensional scanner have a weak point in optical crosstalk. For example, in a situation where a highly reflective target, such as a license plate, a traffic sign, or other type of retro-reflector, is in the field of view, the LIDAR receiver detects target reflections across extended portions or even an entire portion of the Field of View (FOV) due to glare and scattering produced by the retro reflectors. This reflection produces a glare artefact that blocks the LIDAR receiver from seeing essential parts of the scene resulting in a shadowing effect. Thus, objects located in the FOV covered by this glare artefact or "shadow" may go undetected leading to inaccuracies in imaging and ultimately in safety issues in the field of autonomous driving.

Therefore, an improved device that mitigates optical crosstalk due to artefacts caused by highly reflective objects may be desirable.

SUMMARY

According to one or more embodiments, a Light Detection and Ranging (LIDAR) system includes a LIDAR transmitter configured to scan a field of view with a plurality of light beams, each of the plurality of light beams having an oblong shape that extends perpendicular to a scanning direction and a LIDAR receiver. The LIDAR transmitter includes a light source array comprising a plurality of light sources configured to generate a scanning light bar such that each of the plurality of light sources is configured to project into a different region of a plurality of regions of the field of view; and a controller configured to trigger a measurement of the field of view during which at least one targeted region of the field of view is illuminated by the light source array and at least one non-targeted region of the field of view is not illuminated by the light source array. The LIDAR receiver includes a photodetector array configured to receive at least one reflected light beam and generate electrical signals based on the at least one reflected light beam, wherein the photodetector array comprises a targeted pixel group that corresponds to the at least one targeted region of the field of view and a non-targeted pixel group that correspond to the at least one non-targeted region of the field of view; and an optical crosstalk detection circuit configured to receive at least one first electrical signal from the targeted pixel group and at least one second electrical signal from the non-targeted pixel group, detect optical crosstalk that appears at at least one portion of the non-targeted pixel group based on the at least one first electrical signal and the at least one second electrical signal, and define a glare artefact box corresponding to pixels of the photodetector array and defined by the detected optical crosstalk.

According to one or more embodiments, a method of detecting optical crosstalk in a LIDAR system is provided. The method includes oscillating a one-dimensional micro-electromechanical systems (MEMS) oscillating structure about a single axis such that light beams generated by a plurality of light sources of a linear light source array are projected at different transmission directions into the field of view; selectively activating and deactivating the plurality of light sources, wherein each of the plurality of light sources is configured to project a light beam as a different segment of a scanning line into a corresponding region of a plurality of regions of a field of view; triggering a measurement of the field of view during which at least one targeted region of the field of view is illuminated by the light source array and at least one non-targeted region of the field of view is not illuminated by the light source array; generating electrical signals based on at least one reflected light beam being received by a photodetector array, wherein the photodetector array comprises a targeted pixel group that corresponds to the at least one targeted region of the field of view and a non-targeted pixel group that correspond to the at least one non-targeted region of the field of view; processing at least one first electrical signal from the targeted pixel group; processing at least one second electrical signal from the non-targeted pixel group; detecting optical crosstalk that appears at at least one portion of the non-targeted pixel group based on the at least one first electrical signal and the at least one second electrical signal; and defining a glare artefact box corresponding to pixels of the photodetector array and defined by the detected optical crosstalk.

BRIEF DESCRIPTION OF THE DRAWINGS

Embodiments are described herein making reference to the appended drawings.

DETAILED DESCRIPTION

Figure 1:
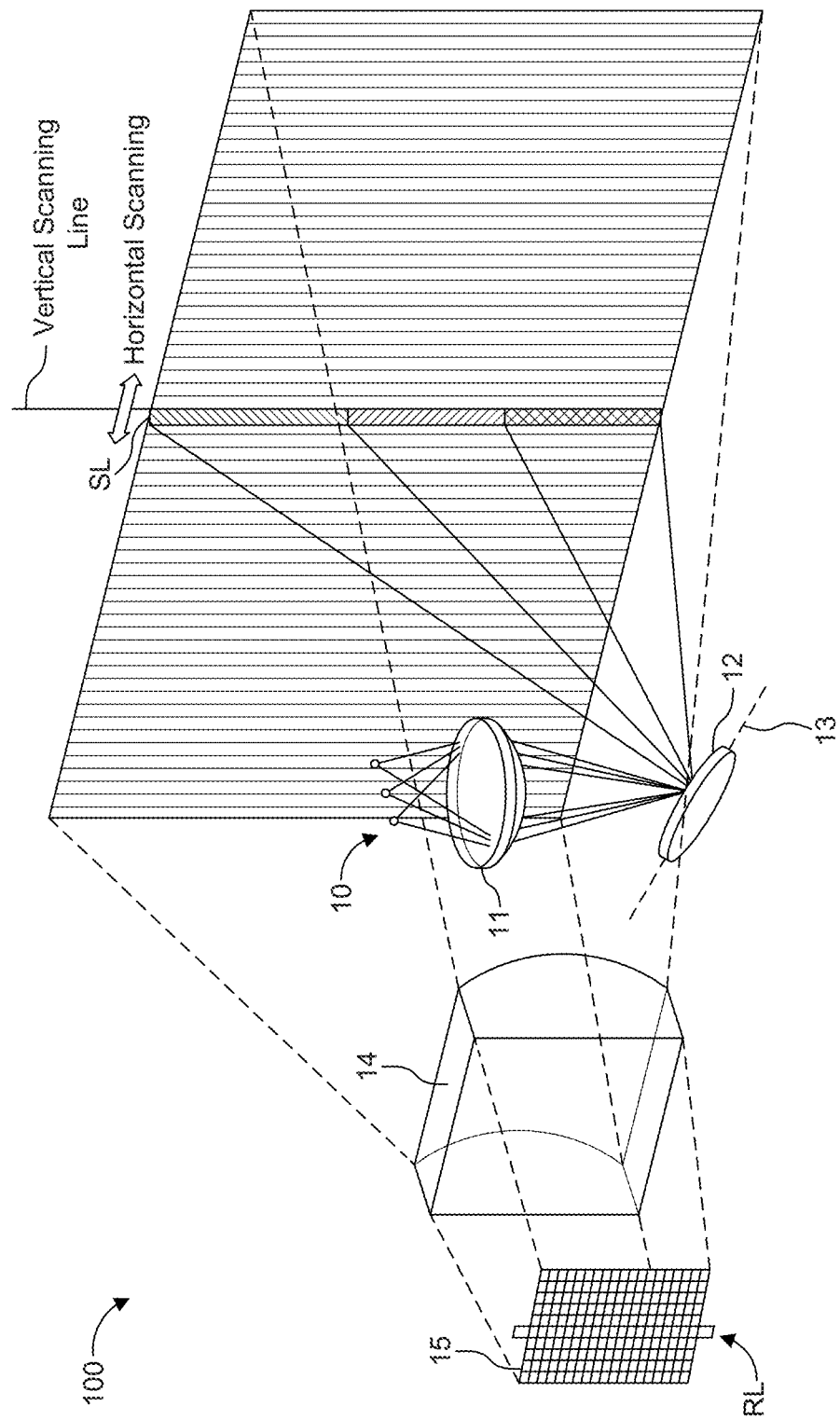
FIG. 1 is a schematic diagram of a LIDAR scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In Light Detection and Ranging (LIDAR) systems, a light source transmits light pulses into a field of view and the light reflects from one or more objects by backscattering. In particular, LIDAR is a direct Time-of-Flight (TOF) system in which the light pulses (e.g., laser beams of infrared light) are emitted into the field of view, and a pixel array detects and measures the reflected beams. For example, an array of photodetectors receives reflections from objects illuminated by the light.

Currently, a photodetector array may be used to measure the reflected light. The photodetector array may be a one-dimensional (1D) array that consists of multiple rows of photodetectors (pixels) arranged in a single column or a two-dimensional (2D) array that consists of multiple rows and columns of photodetectors arranged in a grid-like arrangement. Each pixel row or group of adjacent pixel rows may be readout as a measurement signal in the form of raw analog data. Each measurement signal includes data from a single pixel.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted, corresponding to a start signal, and record a time (i.e, a ToF hit time) the reflected light pulse is received at the receiver (i.e., at the pixel array), corresponding to a ToF hit signal. The "time-of-flight" of the light pulse is then translated into a distance based on each recorded ToF hit time. Multiple ToF hits are possible over a predefined measurement period. In this case, multiple TOF hit times are stored and the counter counts until the end of predefined measurement period, which is defined by a maximum distance to be observed.

In another example, an analog-to-digital converter (ADC) may be electrically coupled to the pixel array (e.g., indirectly coupled with intervening elements in-between) for pulse detection and ToF measurement. For example, an ADC may be used to estimate a time interval between start/ToF hit signals with an appropriate algorithm.

For multiple hit, we do store multiple TOFs and counter counts until the end of measurement (defined by the maximum distance we want to observe).

A scan such as an oscillating horizontal scan (e.g., from left to right and right to left of a field of view) can illuminate a scene in a continuous scan fashion. Each firing of the laser beam by the light sources can result in a scan line in the "field of view." By emitting successive light pulses in different scanning directions, an area referred to as the field of view can be scanned and objects within the area can be detected and imaged. Thus, the field of view represents a scanning plane having a center of projection. A raster scan could also be used.

FIG. 1 is a schematic diagram of a LIDAR scanning system 100 in accordance with one or more embodiments. The LIDAR scanning system 100 is an optical scanning device that includes a transmitter, including an illumination unit 10, a transmitter optics 11, and a one-dimensional (1D) MEMS mirror 12 (1D MEMS scanner), and a receiver, including a primary optics 14, and an optical receiver 15. The optical receiver 15 in the illustration is a 2D photodetector array 15 but may alternatively be a 1D photodetector array. The receiver may further include receiver circuitry, such as data acquisition/readout circuitry and data processing circuitry, as will be further described according to FIG. 2.

While horizontal scanning is depicted, the LIDAR scanning system 100 may be rotated to scan in a different scanning direction. For example, the LIDAR scanning system 100 may be rotated 90° to scan in the vertical direction instead of the horizontal direction.

The photodetector array 15, whether it be a 2D array or a 1D array, is arranged in such a manner that an intended field of view is mapped vertically on the vertical extension of the photodetector array 15. A received light beam will hit only a specific row or group or rows of the detector array depending on the triggered light source and the vertical angle of the received light beam. The intended field of view may be further mapped horizontally on the horizontal extension of a pixel column, in the case of a 1D photodetector array, or mapped horizontally on the horizontal extension of a 2D photodetector array. Thus, in a system that uses a 1D photodetector array, each received light beam (i.e., each receiving line RL) is projected onto the column of the detector array. In a system that uses a 2D photodetector array, each received light beam (i.e., each receiving line RL) is projected onto one of the columns of the detector array.

In this example, the illumination unit 10 is a laser array that includes three light sources (e.g., laser diodes, light emitting diodes, or laser channels) that are linearly aligned in single bar formation and are configured to transmit light used for scanning the field of view for objects. The light emitted by the light sources is typically infrared light although light with another wavelength might also be used. As can be seen in the embodiment of FIG. 1, the shape of the light emitted by the light sources is spread in a direction perpendicular to a scanning direction to form a light beam with an oblong shape extending, lengthwise, perpendicular to the scanning direction. The illumination light transmitted from the light sources are directed towards the transmitter optics 11 configured to focus each laser onto a one-dimensional MEMS mirror 12. The transmitter optics 11 may be, for example, a lens or a prism.

When reflected by the MEMS mirror 12, the light from the light sources are aligned vertically to form, for each emitted laser shot, a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple vertical segments, where each vertical segment corresponds to a respective light source, However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view.

Accordingly, the transmitter of the system 100 is an optical arrangement configured to generate laser beams based on the laser pulses, the laser beams having an oblong shape extending in a direction perpendicular to a scanning direction of the laser beams. As can be seen from FIG. 1, each of the light sources is associated with a different vertical region in the field of view such that each light source illuminates a vertical scanning line only into the vertical region associated with the light source. For example, the first light source illuminates into a first vertical region and the second light sources illuminates into a second vertical region which is different from the first vertical region.

Sequential scanning may be implemented by the transmitter via the controller in that one vertical region in the field of view is illuminated at a time. In particular, one light source may be activated while all other light sources are deactivated. Thus, the plurality of light sources are sequentially activated in this manner to sequentially transmit at different vertical regions in the field of view.

In addition, while three laser sources are shown, it will be appreciated that the number of laser sources is configurable and is not limited thereto. For instance, the vertical scanning line SL may be generated by two or more laser sources.

In one example, 32 pixels may be arranged in a single pixel column and eight light sources may be used. In this case, each light source corresponds to one of eight different vertical regions of the field of view. Thus, each light source may also be mapped to a different group of four pixels (i.e., four pixel rows), wherein each group is mutually exclusive. In essence, each group of pixel is mapped to one of eight different vertical regions of the field of view. Different groups of pixels can be fired at by activating its corresponding light source, whereas other groups may not be fired at by deactivating its corresponding light source.

Pixels that are intended to be fired at (e.g., due to activating a corresponding light source) may be referred to as targeted pixels. In contrast, pixels that are not intended to be fired at (e.g., due to deactivating a corresponding light source) may be referred to as non-targeted pixels. It is noted that even though non-targeted pixels are not intended to be fired at, and thereby not intended to receive reflected laser light, non-targeted pixels may still receive and detect light from both glare artefacts (i.e., reflected laser light artefacts) that are reflected by retro-reflectors and ambient light (i.e., noise).

In the sequential scanning scheme in which vertical regions of the field of view are sequentially targeted, one group of pixels are designated as a targeted group including targeted pixels such that the groups of pixels are sequentially targeted while the remaining pixel groups in each scan are designated as non-targeted groups made up of non-targeted pixels.

The MEMS mirror 12 is a mechanical moving mirror (i.e., a MEMS micro-mirror) integrated on a semiconductor chip (not shown). The MEMS mirror 12 according to this embodiment is configured to rotate about a single scanning axis and can be said to have only one degree of freedom for scanning. Distinguished from 2D-MEMS mirrors (2D MEMS scanners), in the 1D MEMS mirror, the single scanning axis is fixed to a non-rotating substrate and therefore maintains its spatial orientation during the oscillation of the MEMS mirror. Due to this single scanning axis of rotation, the MEMS mirror 12 is referred to as a 1D MEMS mirror or 1D MEMS scanner. However, it will be appreciated that a 2D MEMS mirror may be used in the LIDAR scanning system 100 instead of a 1D MEMS mirror as long as non-targeted pixel groups are used for detecting optical crosstalk, to be described below.

The MEMS mirror 12 is configured to oscillate "side-to-side" about a single scanning axis 13 such that the light reflected from the MEMS mirror 12 (i.e., the vertical scanning line of light) oscillates back and forth in a horizontal scanning direction. A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle of the MEMS mirror 12 on its scanning axis 13. For example, the MEMS mirror 12 may be configured to oscillate between +/−15 degrees in a horizontal scanning direction to steer the light over +/−30 degrees (i.e., 60 degrees) making up the horizontal scanning range of the field of view. In this case, transmission optics (not illustrated) are used to extend the field of view by increasing (e.g., doubling) the angular range of transmitted light from the MEMS mirror 12. Thus, the field of view may be scanned, line-by-line, by a rotation of the MEMS mirror 12 though its degree of motion. One such sequence though the degree of motion (e.g., from −15 degrees to +15 degrees or vice versa) is referred to as a single scan. Thus, two scans are used for each scanning period. Different regions (e.g., different vertical regions) of the field of view may be targeted during each scan or scanning period. Multiple scans may be used to generate distance and depth maps, as well as 3D images by a processing unit.

While the transmission mirror is described in the context of a MEMS mirror, it will be appreciated that other mirrors can also be used. In addition, the degree of rotation is not limited to +/−15 degrees, and the field of view may be increased or decreased according to the application. Thus, a one-dimensional scanning mirror is configured to oscillate about a single scanning axis and direct the laser beams at different directions into a field of view. Hence, a transmission technique includes transmitting the beams of light into the field of view from a transmission mirror that oscillates about a single scanning axis such that the beams of light are projected as a vertical scanning line SL into the field of view that moves horizontally across the field of view as the transmission mirror oscillates about the single scanning axis.

LIDAR systems using 1D-scanning mirrors can use a more relaxed shot-rate of the illumination unit 10 (i.e., transmitter) compared to 2D-scanning mirrors which use laser points for scanning the field of view which requires more shots for the transmitter to scan a field of view. In addition, LIDAR systems using 1D-scanning mirrors are typically more robust against shock and vibrations when compared to 2D-scanning mirrors and are therefore well suited for automotive applications.

Upon impinging one or more objects, the transmitted bar of vertical light is reflected by backscattering back towards the LIDAR scanning system 100 as a reflected vertical line where the second optical component 14 (e.g., a lens or prism) receives the reflected light. The second optical component 14 directs the reflected light onto the photodetector array 15 that receives the reflected light as a receiving line RL and is configured to generate electrical measurement signals. For example, second optical component 14 projects the received reflected light onto targeted pixels of the pixel array 15. However, as will be discussed, non-targeted pixels may also receive reflected light due to optical crosstalk (e.g., due to a reflection by a retro-reflector). The electrical measurement signals may be used for generating a 3D map of the environment and/or other object data based on the reflected light (e.g., via TOF calculations and processing).

The receiving line RL is shown as a vertical column of light that extends along the pixel column in a lengthwise direction of the pixel column. The receiving line has three vertical regions that correspond to the vertical regions of the vertical scanning line SL shown in FIG. 1. As the vertical scanning line SL moves horizontally across the field of view, each light beam (i.e., each receiving line RL) is projected onto the column of the detector array 15. The transmission direction of the scanning ling SL set by the rotation angle of the MEMS mirror 12 is mapped to an image column of an image structure mapped to the field of view.

The photodetector array 15 can be any of a number of photodetector types; including avalanche photodiodes (APD), photocells, and/or other photodiode devices. Imaging sensors such as charge-coupled devices (CCDs) can be the photodetectors. In the examples provided herein, the photodetector array 15 is a one-dimensional (1D) APD array that comprises an array of APD pixels arranged in a single column. As provided herein, "photodiodes" and "pixels" are used interchangeably.

Moreover, the photodetector array 15 is a static the photodetector array 15. Meaning, all pixels are activated and are capable of being readout at all times via a corresponding readout channel. As a result, each pixel is fixedly assigned and coupled to a readout channel so that any time a pixel generates an electrical signal, the signal can be read out. pixels Thus, receiver circuitry may receive electrical signals via the readout channels from both targeted and non-targeted pixels. All pixels can be read out for each discrete transmission angle of the MEMS mirror 12.

A measurement period may be defined for each discrete transmission angle during which a receiver circuit monitors for electrical signals generated by the photodetector array 15. For example, the measurement period may start at a transmission time of the laser and may lapse after a predetermined time period thereafter (e.g., after 2 μs). A pixel may receive multiple reflections during the measurement period corresponding to backscattering occurring at objects located at different distances. In other words, a pixel may receive multiple reflected light pulses at different times over the measurement period, where each pulse corresponds to a different object distance.

The photodetector array 15 receives reflective light pulses as the receiving line RL and generates electrical signals in response thereto. Since the time of transmission of each light pulse from the illumination unit 10 is known, and because the light travels at a known speed, a time-of-flight computation using the electrical signals can determine the distance of objects from the photodetector array 15. A depth map can plot the distance information.

In one example, for each distance sampling, a controller triggers a laser pulse from each of the light sources of the illumination unit 10 and also starts a timer in a Time-to-Digital Converter (TDC) Integrated Circuit (IC). This can also be performed using a field-programmable gate array (FPGA). The laser pulse is propagated through the transmission optics, reflected by the target field, and captured by one or more receiving photodiodes of the photodetector array 15. Each receiving photodiode emits a short electrical pulse that is read out by the analog readout circuit. Each signal that is read out of the analog readout circuit may be amplified by an electrical signal amplifier.

A comparator IC recognizes the pulse and sends a digital signal to the TDC to capture the timer value corresponding to the ToF hit time to capture the time-of-flight. The TDC uses a clock frequency to calibrate each measurement. The TDC sends the serial data of the differential time between the start and ToF hit digital signals to the controller, which filters out any error reads, averages multiple time measurements, and calculates the distance to the target at that particular field position. By emitting successive light pulses in different directions established by the MEMS mirror 12, an area (i.e., a field of view) can be scanned, a three-dimensional image can be generated, and objects within the area can be detected.

The signal processing chain of the receiver may also include an ADC for each photodiode. The ADC is configured to convert the analog electrical signals from the photodiode into a digital signal that is used for further data processing.

In addition, instead of using the TDC approach, ADCs may be used for signal detection and ToF measurement. For example, each ADC may be used detect an analog electrical signal from one or more photodiodes to estimate a time interval between a start signal (i.e., corresponding to a timing of a transmitted light pulse) and a ToF hit signal (i.e., corresponding to a timing of receiving an analog electrical signal at an ADC) with an appropriate algorithm.

When a pulse of laser energy as a vertical scanning line SL enters the field of view from the surface of MEMS mirror 12, reflective pulses appear when the laser light illuminates an object in the field of view. These reflective pulses arrive at the photodetector array 15 as a bar of light that may span vertically across one or more pixels. That is, all photodetector pixels in a pixel column (e.g., if all light sources are triggered) or a portion of the photodetector pixels (e.g., if only a portion of the light sources are triggered) may receive reflected laser light. For example, in one instance, all light sources of the illumination unit 10 may be used to generate the scanning line SL/receiving line RL. In this case, the receiving line RL may extend along the full pixel column in the lengthwise direction. In another instance, only a subset of the light sources may be used to generate the scanning line SL/receiving line RL. In this case, the receiving line may extend along only a portion of the pixel column in the lengthwise direction.

The photodetector array 15 is configured to generate measurement signals (electrical signals) used for generating a 3D map of the environment based on the received reflected light and the transmission angle/direction of a corresponding transmitted beam (e.g., via TOF calculations and processing). While not shown, the LIDAR scanning system 100 may also include a digital micromirror device (DMD) and a secondary optics (e.g., a lens, a total internal reflection (TIR) prism, or a beam splitter) that are configured to initially receive the reflected light through the primary optics 14, and redirect the received reflected light towards the photodetector array 15. For example, the DMD would first receive the reflected light pulse from the primary optics, and deflect the received reflected light through the secondary optics (e.g., a lens, a total internal reflection (TIR) prism, or a beam splitter) onto the photodetector array 15. In this case, the photodetector array 15 would still receive a vertical column of light, as described above.

Figure 2:
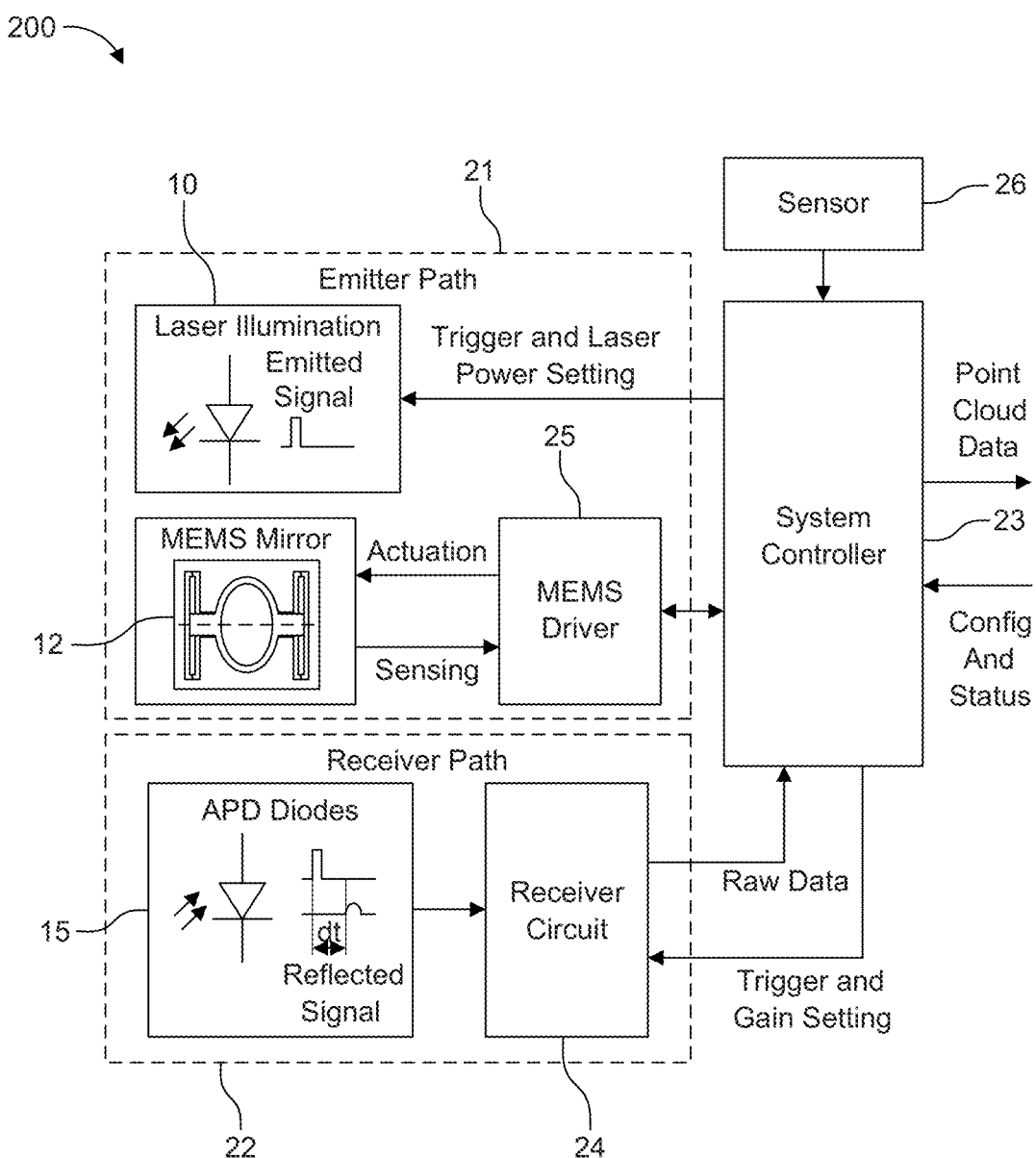
FIG. 2 is a schematic block diagram of a LIDAR scanning system in accordance with one or more embodiments.

FIG. 2 is a schematic block diagram of the LIDAR scanning system 200 in accordance with one or more embodiments. In particular, FIG. 2 shows additional features of the LIDAR scanning system 200, including example processing and control system components such as a MEMS driver, a receiver circuit, and a system controller.

The LIDAR scanning system 200 includes a transmitter unit 21 that is responsible for an emitter path of the system 200, and a receiver unit 22 that is responsible for a receiver path of the system 200. The system also includes a system controller 23 that is configured to control components of the transmitter unit 21 and the receiver unit 22, and to receive raw data from the receiver unit 22 and perform processing thereon (e.g., via digital signal processing) for generating object data (e.g., point cloud data). Thus, the system controller 23 includes at least one processor and/or processor circuitry (e.g., comparators and digital signal processors (DSPs), a dedicated IC, or a FPGA) of a signal processing chain for processing data, as well as control circuitry, such as a controller, that is configured to generate control signals. The controller may be a FPGA that generates the control signals. The LIDAR scanning system 200 may also include a sensor 26, such as a temperature sensor, that provides sensor information to the system controller 23.

The transmitter unit 21 includes the illumination unit 10, the MEMS mirror 12, and a MEMS driver 25 configured to drive the MEMS mirror 12. In particular, the MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photodiodes are activated to sense, and thus measure, a reflected light signal. Thus, a higher accuracy in position sensing of the MEMS mirror results in a more accurate and precise control of other components of the LIDAR system.

The receiver unit 22 includes the photodetector array 15 as well as a receiver circuit 24 that includes an analog readout circuit, including transimpedance amplifiers (TIAs), and a digital readout circuit, including analog-to-digital converters (ADCs).

The analog readout circuit includes N analog output channels (e.g., 32 channels) each configured to read out measurement signals received from an assigned pixel of the photodetector array 15. One acquisition of analog data from the photodetector array 15 on an analog output channel may be referred to as an analog sample, and each analog output channel may be used to acquire different analog samples. Each sample further corresponds to a sample time, at which time measurement signals are read out from the corresponding pixel.

Thus, the receiver circuit 24 may receive the analog electrical signals from the photodetectors of the photodetector array 15 and transmit the electrical signals as raw analog data to a single bit or a multibit ADC. A single bit ADC outputs a one bit signal each time a TOF hit is detected. The one bit signal simply indicates that a reflected signal pulse was received. In contrast, a multibit ADC outputs a multibit signal that additionally includes amplitude information corresponding to the intensity of the reflected signal pulse.

Prior to the ADC receiving the electrical signals, the electrical signals from each channel may pass through a corresponding amplifier (e.g., a transimpedance amplifier (TIA)) of N amplifiers that converts the electrical signals from, for example, current into voltage. In the case of one bit signal processing, a TIA may be used without an external ADC coupled thereto. TIAs have a comparator at their output, which is a one-bit ADC. Thus, an additional ADC external to the TIA is not needed in this circumstance and only a TIA may be used.

Thus, each TIA and each ADC are incorporated in the receiver circuit 24. One acquisition of ADC data may be referred to as an ADC sample, which may also be referred to as a digital sample. Each sample further corresponds to a sample time, at which time measurement signals are read out from one or more pixels.

The ADCs are configured to convert the raw analog data into raw digital data for transmission to the system controller 23, which performs further processing on the raw digital data, including averaging and pulse detection, crosstalk analysis and mitigation, and generating 3D point cloud data. Thus, each of the analog output channels is coupled to a corresponding ADC of N ADCs that is configured to convert the analog data from a respective analog output channel into digital data. As a result, the receiver circuit 24 also includes a digital readout circuit of N digital output channels, each being coupled to a different corresponding analog output channel via a different corresponding ADC.

The receiver circuit 24 may also receive trigger control signals from the system controller 23 that triggers an activation of all the photodetectors for a measurement period. The receiver circuit 24 may also receive gain setting control signals for controlling the gain of one or more photodetectors.

The system controller 23 includes signal processing circuitry that receives the raw digital data as well as serial data of a differential time between start and ToF hit digital signals generated by an ADC, and uses the received data to calculate time-of-flight information for each field position within the field of view, to generate object data (e.g., point cloud data), and to generate a 3D point cloud.

Acquired LIDAR data includes data from a reflected object signal, originating from a LIDAR transmitted laser beam reflecting off an object, and a noise signal, originating from other light sources such as ambient light (e.g., from the sun). Ambient noise typically has a smaller magnitude when compared to a reflected object laser signal.

Figure 3A:
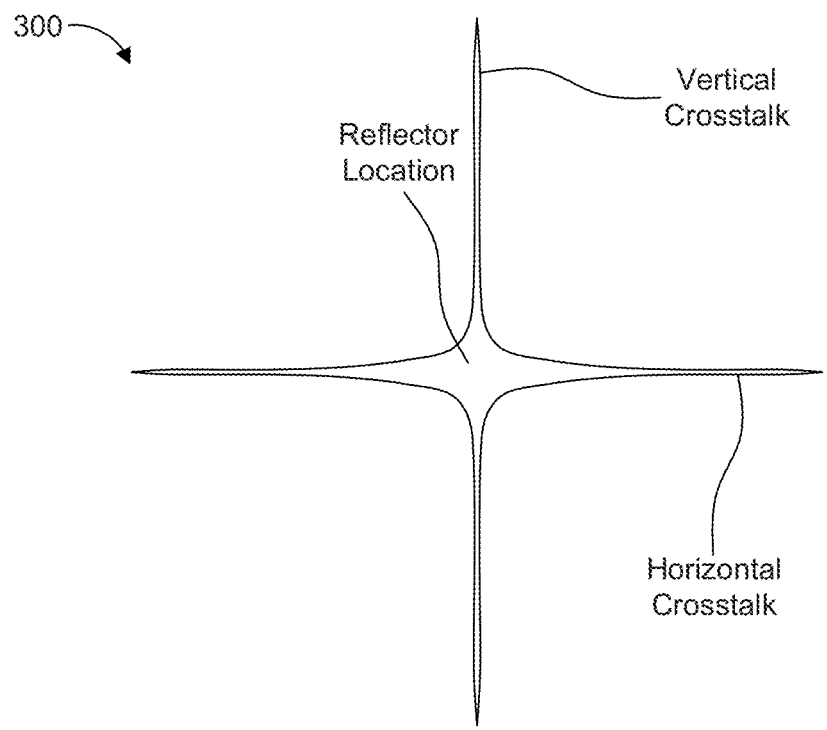
FIG. 3A shows an example of retro-reflector glare artefact according to one or more embodiments.

FIG. 3A shows an example of retro-reflector glare artefact 300 according to one or more embodiments. In this case, the reflector is located in the middle of the cross-like reflection, also referred to as a crosstalk artefact. The artefact 300 is made up by vertical crosstalk that extends along a vertical axis and horizontal crosstalk that extends along a horizontal axis.

Figure 3B:
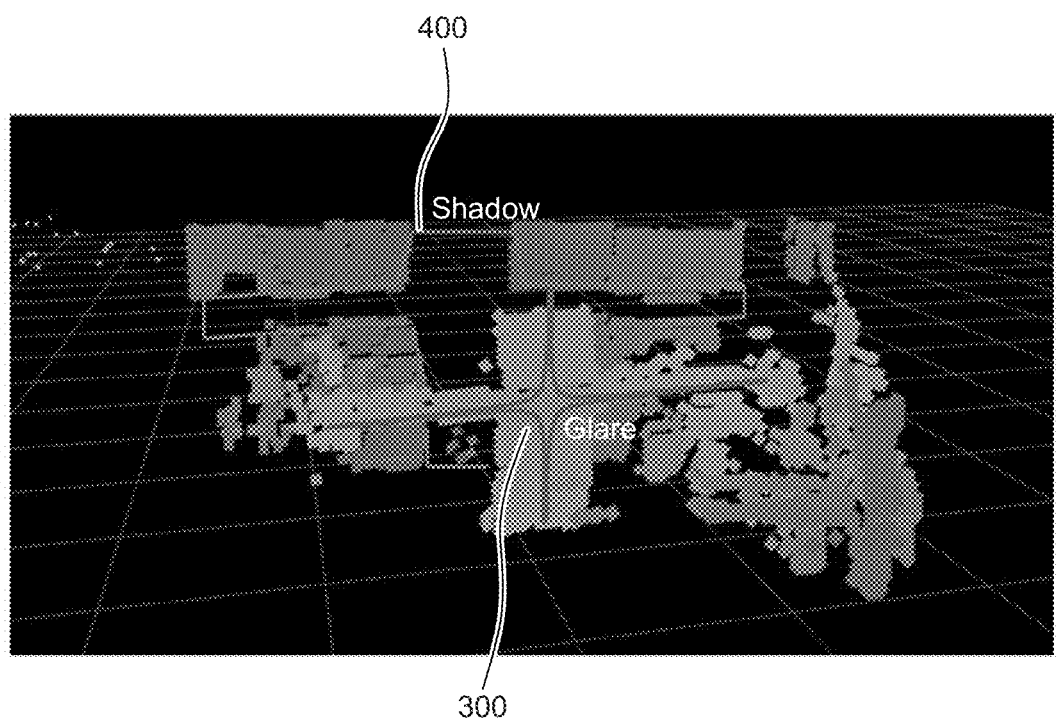
FIG. 3B shows an example of a point cloud of a 1D scanning LIDAR system with the retro-reflector glare artefact according to one or more embodiments.

FIG. 3B shows an example of a point cloud of a 1D scanning LIDAR system with the retro-reflector glare artefact 300 according to one or more embodiments. In this case, the retro-reflector glare artefact 300 blocks the receiver from seeing parts of the scene corresponding to same time-of-flight as the reflector. In other words, objects locates at the same distance as the reflector are obscured by the retro-reflector glare artefact 300 and may go undetected. This produces a shadow 400 in the point cloud.

Figure 4:
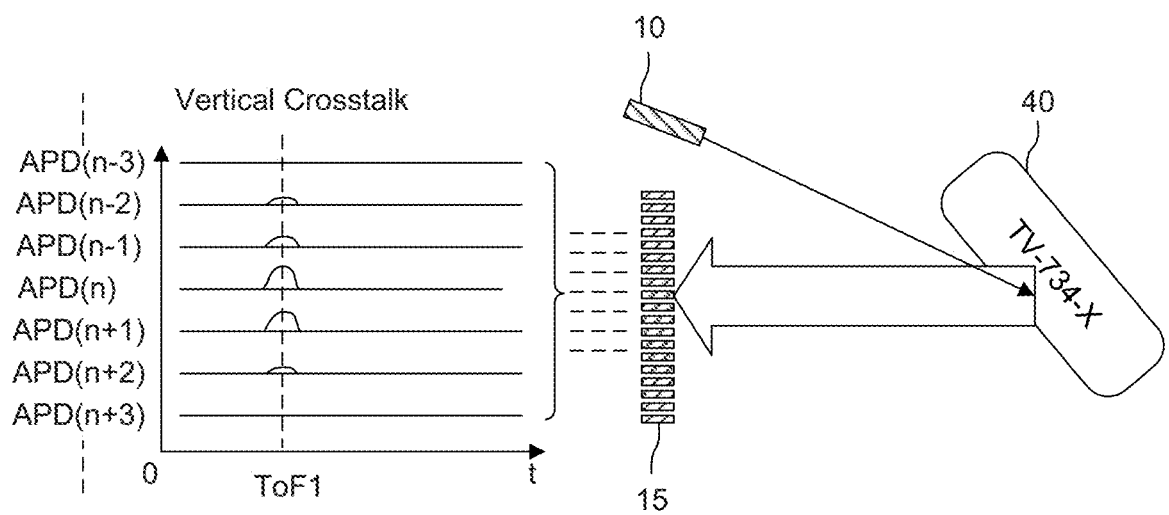
FIG. 4 shows an example of vertical crosstalk detected at a photodetector array according to one or more embodiments.

FIG. 4 shows an example of vertical crosstalk detected at photodetector array 15 according to one or more embodiments. FIG. 4 includes a signal diagram of a photodetector array over a measurement period t. A time-of-flight (TOF) is charted over a measurement period t. The time-of-flight starts at zero to coincide with the firing of the laser beam and ends at the end of the measurement period t. The measurement period t is a predetermined (i.e., limited) amount of time during which electrical pulses are read out for a single sample period. Any electrical pulses generated by the photodetector array 15 are read out and processed. The measurement period t is an amount of time during which reflected light can be expected to be received. After the expiration of the measurement period, a new sampling of the FOV can be performed, including a new laser beam transmission with the measurement period being reset and new set of TOF measurements being taken.

Turning back to FIG. 4, the time-of-flight progresses from zero towards measurement period t based on the time it takes for a return pulse to be detected. Pixels that detect a light pulse at the same time generate a corresponding electrical pulse that coincides with the same time-of-flight time, referred to as a time-of-fight index. In theory, it would be said that these pixels that generate an electrical pulse at the same time-of-fight index detect one or more objects having a same distance from the photodetector array 15.

However, in this case, a light source of illumination unit 10 fires a laser beam that is reflected by a retro-reflector 40 and is incident on a single pixel APD(n) of the photodetector array 15. This pixel APD(n) may be referred to as a retro-reflector pixel, as it correspond to the actual location of the retro-reflector. There may be two or more retro-reflector pixels depending on the size or distance of the retro-reflector object. Those pixels adjacent to the retro-reflector pixel that experience crosstalk may be referred to as crosstalk pixels or simply neighboring pixels.

The return echo from retro-reflector 40 on pixel APD(n) is so strong that it appears on neighboring channels in the electrical domain. Thus, the highly reflective object causes leakage in the electrical domain into neighboring pixels APD(n−1), APD(n−2), APD(n+1), and APD(n+2). This effect may also be seen from low reflective objects located at a close range to the photodetector array 15. This may lead to a false reading by the neighboring pixels that an object is present at the same time-of-flight distance that corresponds to the electrical pulse generated by pixel APD(n).

In order to mitigate crosstalk between pixels, certain system properties may be used in one or more combinations.

First, a 1D scanning system may be implemented that uses a scanning laser bar and a static receiver pixel array.

Second, the laser may follow a sequential firing pattern such that only a portion of the vertical regions of the field of view is illuminated at a given time. This can be done by only triggering a portion of the light sources at a time, leaving other light sources deactivated. Thus, for each laser beam transmission there exists a group of targeted pixels and non-targeted pixels.

Third, the photodetector array can be read out at all times, even for the untargeted part of the field of view.

Fourth, the receiver circuit 24/system controller 23 is configured to detect multiple target reflections per pixel/angle measurement. In other words, the photodetector array 15 is capable of generating multiple electrical pulses at different time-of-flights in a measurement period, even by the same pixel, and the receiver circuit 24/system controller 23 is configured to receive these multiple electrical pulses over the measurement period.

When the laser illuminates only a part of the field of view, normally the untargeted pixels of the photodetector array 15 will not produce any output signal other than noise produced by ambient-light induced noise. Such electrical pulses are small and can be filtered out by thresholding. However, when the laser beam or laser sidelobes hit a retro-reflector, the pixels across that horizontal or vertical part of the field of view will actually trigger and return a signal that may be interpreted as if an actual target is producing a reflection for that specific pixel, angle, and distance. Said differently, the signal produced by vertical or horizontal crosstalk may be interpreted as a hit on an object in the field of view for that specific pixel, angle, and distance when no such object at that specific pixel, angle, and distance exists.

Crosstalk artifacts share common properties that can be used to detect the artefacts in one or more combinations.

Vertical crosstalk artefacts share a common angle. Thus, an apparent object detected at a same transmission angle over multiple adjacent pixels may be one indicator for vertical crosstalk.

Both vertical and horizontal crosstalk share a common distance (i.e., time-of-flight). That is because reflected light related to glare artefacts arrive at the neighboring pixels of the photodetector array 15 at the same time (i.e., at the same time-of-flight) the "real" reflected light is received from the actual location of the retro-reflector.

Furthermore, for vertical crosstalk, pulse amplitudes generated by the neighboring pixels are inversely related to distance from the retro-reflector pixel. Thus, neighboring pixels further away from the retro-reflector pixel should generate electrical pulses that have a smaller amplitude than neighboring pixels that are close to the retro-reflector pixel. A decrease in amplitude across multiple neighboring pixels with increasing distance from the retro-reflector pixel may be an indicator of vertical crosstalk.

Additionally, for horizontal crosstalk, pulse amplitudes generated by the neighboring pixels are inversely related to position of the retro-reflector with respect to transmission angle. For example, if considering a retro-reflector is located at a first transmission angle and is detected by the retro-reflector pixel, the retro-reflector pixel may detect a weaker reflected signal at a second transmission angle adjacent to the first transmission angle. Moreover, the retro-reflector pixel may detect an even weaker reflected signal at a third transmission angle adjacent to the second transmission angle, where the second transmission angle is between the first and the third transmission angles. This may occur in both horizontal directions from the first transmission angle. This decrease in pulse amplitude in the horizontal directions by the same pixel may be an indicator of horizontal crosstalk.

In a 2D photodetector array, neighboring pixels in the horizontal direction can be evaluated for horizontal crosstalk in a similar manner described for vertical crosstalk. A targeted pixel or group of pixels may correspond to both an activated light source and a transmission angle and a non-targeted pixel or group of pixels may correspond to the same light source but one or more different transmission angles. In the event a targeted pixel is a retro-reflector pixel, those neighboring, non-target pixels horizontal to the targeted pixel may be evaluated where pulse amplitudes at the neighboring, non-targeted pixels are inversely related to the position of the targeted pixel.

By combining two or more crosstalk indicators and recording the transmission angle, pixel number, and distance, a probability of identifying a crosstalk pixel is increased and steps can be taken by a DSP to mitigate the identified crosstalk event and possibly remove glare artefacts from the point cloud.

A three step approach may be used for crosstalk analysis and mitigation: detection and flagging, artefact probability scoring, and probability thresholding.

The first step is referred to as detection and flagging. This process includes sequential scanning, reading out and monitoring untargeted pixels, and flagging TOF hits based on common artefact properties derived from the untargeted pixels.

Sequential firing includes reading the full photodetector array 15, including both targeted and untargeted pixels for every laser shot over a measurement period. Typically, a single shot signal-to-noise ratio (SNR) is already sufficient for reliable flagging. If untargeted pixels produce an output signal (i.e., an electrical pulse), the system controller 23 is configured to record the transmission angle corresponding to the rotation angle of the MEMS mirror 12, the pixel number of the untargeted pixel that generates the signal, and the TOF (i.e., the distance).

The system controller 23 also flags the area containing the artefacts in the point cloud corresponding to the TOF and transmission angle to define an artifact box.

This step includes identifying potential artefact areas in the LIDAR point-cloud by observing unilluminated (i.e., untargeted) parts of the LIDAR FOV. The untargeted parts of the FOV are those regions in the FOV corresponding to deactivated light sources, and further correspond to untargeted pixels of the photodetector array 15. As noted above, normally the untargeted pixels of the photodetector array 15 will not produce any output signal other than noise produced by ambient-light induced noise. Thus, the presence of an electrical pulse at an untargeted pixels, for example, greater than a noise signal level, may be indicative of an abnormality such as pixel crosstalk.

Figure 5:
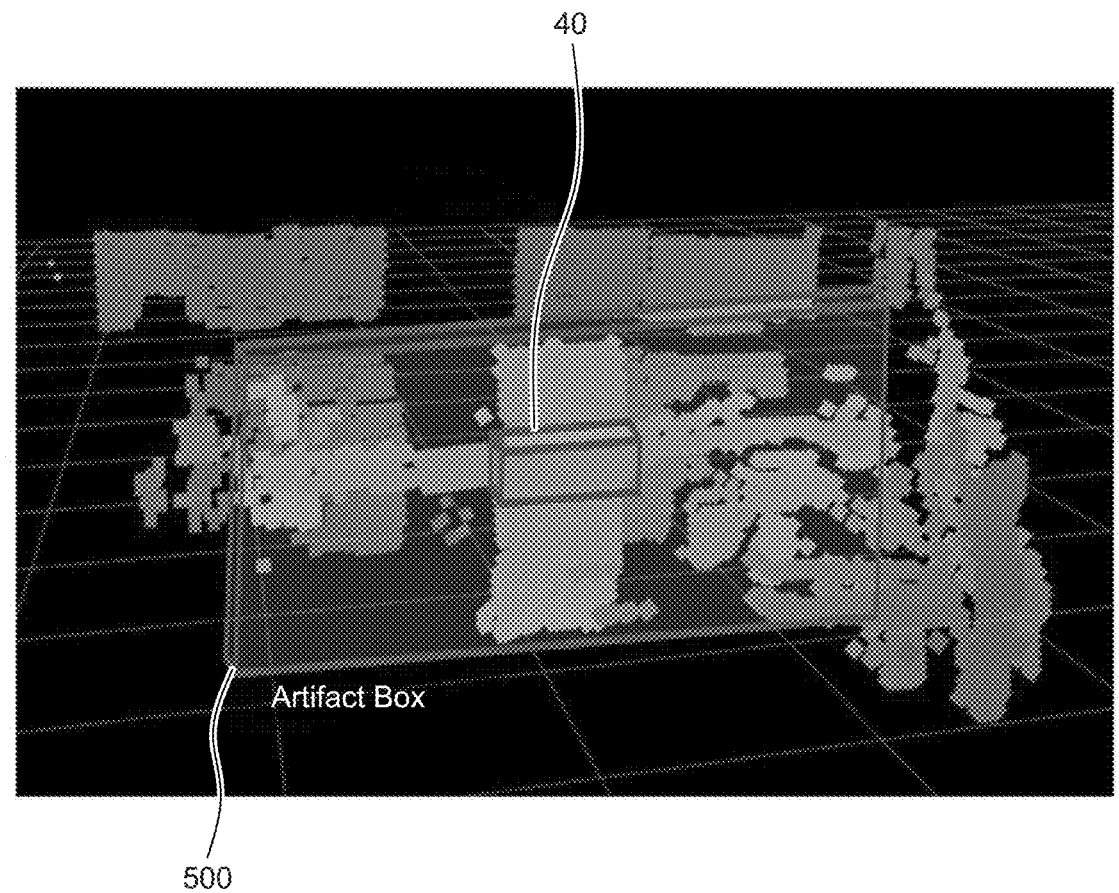
FIG. 5 shows the example of a point cloud with the retro-reflector glare artefact shown in FIG. 3B, with an artefact box further defined according to one or more embodiments.

By monitoring the untargeted pixels of the photodetector array 15, where electrical signals are expected to be below a threshold value, the system controller 23 can detect the potential presence of a retro-reflector, defined by firing angle, pixel number, and distance. With this information, the receiver processing defines a "bounding box" or an "artefact box" in the field of view. FIG. 5 shows the example of the point cloud with the retro-reflector glare artefact 300 shown in FIG. 3B, with an artefact box 500 further defined by the system controller 23. As can be see, areas in the point cloud that correspond to untargeted pixels are used to define the artefact box. The target reflections received within the artefact box are flagged by the system controller 23 for further analysis.

The second step is referred to as artefact probability scoring. This step includes analyzing the potential artefact areas by checking if the artefact is "transparent" and assigning each TOF hit a probability score. Here, the system controller 23 applies a probability scoring algorithm in which every detected hit starts with a probability score of 100%. The probability scoring algorithm checks the flagged target reflections from step 1 for additional reflections at a different time-of-flight.

Figure 6:
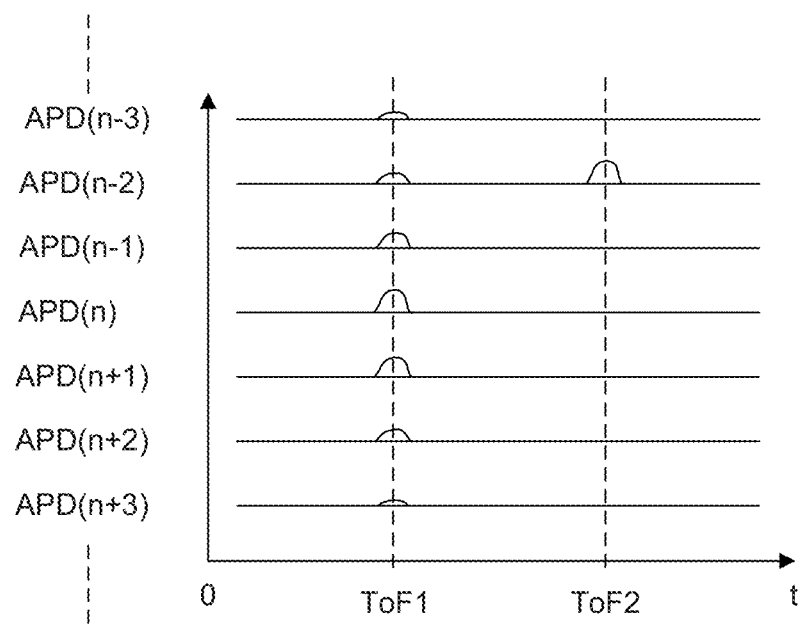
FIG. 6 shows a signal diagram of a photodetector array over a measurement period t according to one or more embodiments.

For example, FIG. 6 shows a signal diagram of a photodetector array over a measurement period t according to one or more embodiments. In this case, each pixel of the photodetector array generates an electrical pulse at a first time-of-flight TOF1, which may be indicative of vertical crosstalk. Additionally, pixel APD(n−2) generates a second electrical pulse at a second time-of-flight TOF2, where TOF1 corresponds to a first object distance and TOF2 corresponds to a second, further object distance at a same transmission angle. Here, it can be said that the electrical pulse at TOF2 is behind the artefact box because it occurs later in time.

If the same pixel (e.g., APD(n−2)) and the same transmission angle contains one or more reflections behind the artefact box, this indicates that the perceived target detected within the artefact box was actually transparent, allowing laser light to pass therethrough and be reflected by a more distant object. This indicates a high likelihood that the reflection detected by the pixel at TOF1 was actually a retro-reflector glare artefact. In this case, the probability score is lowered with a predefined fraction for every additional detected target in the same pixel/angle combination.

For instance, a probability modifying fraction may be set to 75%. When a perceived target within the artefact box has three additional targets behind it (i.e., three additional electrical pulses), the resulting probability score would be 0.75*0.75*0.75=42%.

Thus, if pixels contain further TOF hits after a flagged distance corresponding to the distance of the artefact box, the system controller 23 decreases the likelihood score for the affected pixel/hit, which coincidently increase the likelihood that the hit at the flagged distance is an artefact. Flagged pixels without more hits likely defines the actual location of the retro-reflector. Additionally, actual targets will not have been flagged.

In summary for step 2, the system controller 23 generates an artefact likelihood score per TOF hit for each pixel, checks whether a pixel contains more than one hit, checks a distance and amplitude correlation (if amplitude is available), and determines that pixels without more hits are valid targets, while decreases the probability that a TOF hit is valid if it is followed by one or more additional TOF hits in the same measurement period.

The third step is referred to as probability thresholding. This step includes mitigating the potential artefact areas through thresholding and artefact reporting. Upon completing step 2, the system controller 23 has recorded a probability score for each TOF hit for each pixel. The system controller 23 may compare each probability score to a predefined probability threshold, and discard any TOF hits with a probability score less than the predefined probability threshold. For example, a predefined probability threshold of 50% would result in any TOF hit having a probability score less than 50% be discarded and not reported (output) to the system controller 23.

Alternatively, the system controller 23 may transmit the probability score for each TOF hit as part of the point cloud output protocol (i.e., along with the digital measurement data), such that the vehicle's artificial intelligence can decide what to do with low probability targets.

The system controller 23 may also perform likelihood thresholding during which a laser beam is transmitted in the same vertical region of the FOV at the same transmission angle multiple times, and the number of TOF his is counted to generate a likelihood histogram. For example, if a laser beam is shot in the above manner eight times, eight TOF hits may indicate a certain target, some number of intermediary number of hits (e.g., two to six hits) may indicate potential glare or crosstalk, and a low number of hits (e.g., less than two) may indicate an interferer or false hit. The system controller 23 may than only report TOF hits above a likelihood threshold to a point cloud processor, or report the likelihood score to the to a point cloud processor or other vehicle artificial intelligence along with the digital measurement data.

Figure 7:
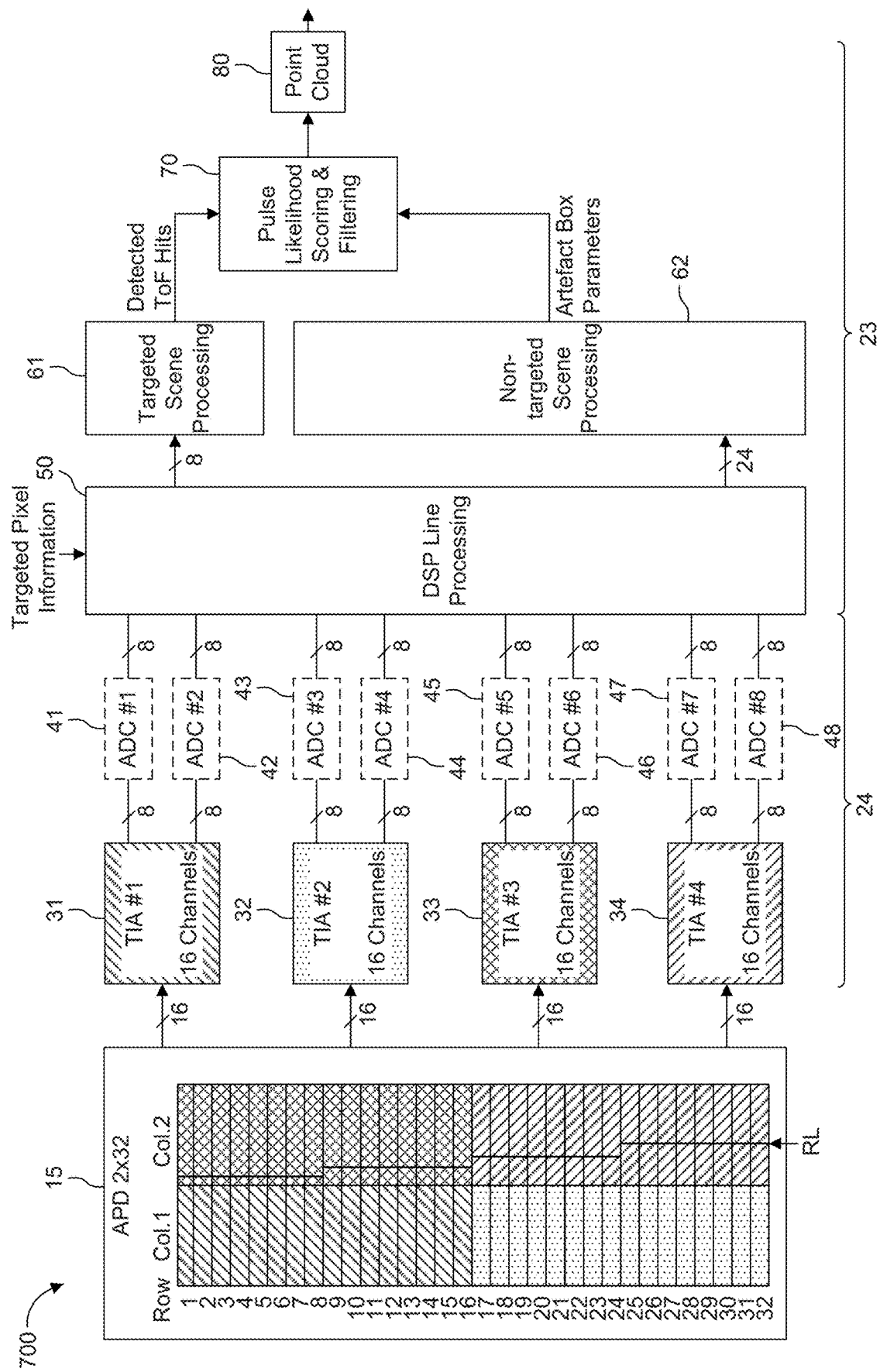
FIG. 7 is a schematic block diagram of a glare artefact processing chain according to one or more embodiments.

FIG. 7 is a schematic block diagram of a glare artefact processing chain 700 according to one or more embodiments. In particular, the glare artefact processing chain 700 is incorporated in the receiver unit 22 and the system controller 23 of the LIDAR system 200, where the receiver circuit 24 includes TIAs and ADCs, and the system controller 23 receives the digital raw data from the ADCs and includes further digital signal processing, crosstalk detection and analysis, and point cloud generation.

In this example, the photodetector array 15 is 2×32 APD array having two pixel columns, 32 pixel rows, and 64 pixels in total. The glare artefact processing chain 700 includes a plurality of TIAs 31-34 coupled to assigned pixels of the photodetector array 15. In particular, each TIA is coupled to a fixed group of adjacent pixels in both pixel columns via 16 analog readout channels. As a result, TIA 31 is coupled to the pixels in columns 1 and 2, rows 1-8 TIA 32 is coupled to the pixels in columns 1 and 2, rows 9-16; TIA 33 is coupled to the pixels in columns 1 and 2, rows 17-24; and TIA 34 is coupled to the pixels in columns 1 and 2, rows 25-32.

As such, each TIA receives 8 line from a first APD column and another 8 lines from a second APD column for defined channels (i.e, each TIA is processing 8 channels for each APD column). The output of each TIA includes 8 LVDS lines or 8 analog outputs if external ADCs are used. In the latter case, the input to the DSP line is some interface providing n-bit digital data for 8 APD channels).

Alternatively, TIA 31 may be coupled to the pixels in column 1, rows 1-16; TIA 32 may be coupled to the pixels in column 1, rows 17-32; TIA 33 may be coupled to the pixels in column 2, rows 1-16; and TIA 34 may be coupled to the pixels in column 2, rows 17-31, or some other configuration.

The pixel rows may be arranged into sub-groups that are each mapped to a different vertical region in the field of view. Each sub-group of rows further corresponds to and is mapped to a different light source of the illumination unit 10. For example, a first sub-group may include pixel rows 1-8 that are mapped to a first (i.e., an uppermost) vertical region in the field of view and mapped to a first light source or a first pair of light sources. A second sub-group may include pixel rows 9-16 that are mapped to a second (i.e., a second uppermost) vertical region in the field of view and mapped to a second light source or a second pair of light sources. A third sub-group may include pixel rows 17-24 that are mapped to a third (i.e., a second lowermost) vertical region in the field of view and mapped to a third light source or a third pair of light sources. A fourth sub-group may include pixel rows 25-32 that are mapped to a fourth (i.e., a lowermost) vertical region in the field of view and mapped to a fourth light source or a fourth pair of light sources.

As a result of the mapping to different pixel sub-groups, the system controller 23 is configured to track which pixels and channels are targeted pixels/targeted channels that correspond to a triggered light source. Similarly, the system controller 23 is configured to track which pixels and channels are non-targeted pixels/non-targeted channels that correspond to non-triggered light sources. In addition, when implementing a 2D photodetector array, the system controller 23 also tracks which pixel column is targeted and which pixel column(s) is not targeted based on the transmission angle of the MEMS mirror 12.

The receiver chain reads out and processes all pixels simultaneously. Each TIA 31-34 converts the electrical signals generated by its assigned pixels from, for example, a current into a voltage. Each TIA 31-34 has two sets of output channels, each set corresponding to a different sub-group of pixel rows (i.e., sub-group of pixels). As a result, one set of output channels from a TIA may output voltage signals corresponding to eight targeted pixels and the other set of output channels from the TIA may output voltage signals corresponding to eight non-targeted pixels depending on which vertical region of the field of view is targeted by a laser beam. Alternatively, both sets of output channels from a TIA may output voltage signals corresponding to eight non-targeted pixels depending on which vertical region of the field of view is targeted by a laser beam. Each TIA output is differential meaning the number of lines is the number of channels times two. In particular, low-voltage differential signaling (LVDS) signals from the TIA are used as an input to a FPGA. Single line would have the same effect, but LVDS signals has some advantages on signal integrity and low power when it comes to switching (e.g., lower the gap between the channels).The output channels from the TIAs 31-34 are coupled to optional ADCs 41-48. The ADCs 41-48 are configured to convert the analog voltage signals into digital ADC samples, each of which correspond to a TOF index (i.e., a TOF hit time or distance). In the case of one bit signal processing, a TIA may be used without an external ADC coupled thereto. TIAs have a comparator at their output, which is a one-bit ADC. Thus, an additional ADC external to the TIA is not needed in this circumstance and only a TIA may be used. A one-bit ADC integrated in a TIA may merely indicate a detection of a TOF hit, whereas a multibit ADC, external to a TIA, may additionally provide amplitude information for each TOF hit. In the event that there are multiple TOF hits on a pixel in a measurement period, a TIA or an ADC may output multiple ADC samples at different times over the measurement period for that respective pixel.

The output channels of the ADCs 41-48 are coupled to a DSP line processing circuit 50 that is configured to receive the ADC samples from the ADCs 41-48 and perform averaging and pulse detection. As part of the pulse detection, the DSP line processing circuit 50 may be configured to perform TOF measurements (i.e., distance measurements), pulse magnitude (i.e., amplitude) measurements, and pulse length measurements for each pixel and record the corresponding values for each pixel according to pixel number.

In addition, a histogram may be used to sum and average the detected pulses over a plurality of measurements. For example, a laser may be fired at the same vertical region at the same angle eight times to obtain eight samples, and the DSP line processing circuit 50 may calculation the average of the number of samples for each respective pixel.

The presence or absence of the histogram is open to design choice. Having it present increases the required resources, but improves the reliability of the artefact box. Omitting it would be an implementation optimization at the cost of losing artefact detection at longer distances.

The DSP line processing circuit 50 also includes a multiplexer configured to receive targeted pixel information and selectively output detected pulse information to either the targeted scene processing circuit 61 or to the non-targeted scene processing circuit 62 based on the received targeted pixel information.

The targeted pixel information indicates which pixels of the pixel array are targeted pixels based on the targeted vertical region of the field of view (i.e., based on the triggered light source(s)) and possibly the transmission angle. By the process of elimination, the targeted pixel information also indicates which pixels of the pixel array are non-targeted pixels. Thus, the multiplexer is configured to selectively output pulse information to the respective processing block 61 or 62. For the example given, there are 8 targeted APD channels that result in 8 lines being output from the DSP line processing circuit 50 to the targeted scene processing circuit 61. The remaining 24 APD channels correspond to non-targeted APD pixel lines, meaning that there are 24 lines being output from the DSP line processing circuit 50 to the non-targeted scene processing circuit 62. The number of targeted APD channels is configurable. For example, 4 APD channels may be targeted instead of 8, resulting in 28 non-targeted APD channels.

The targeted scene processing circuit 61 is configured to receive pulse information corresponding to electrical signals generated by targeted pixels, determine detected TOF hits, and output the detected TOF hits to the crosstalk processing circuit 70.

The non-targeted scene processing circuit 62 is configured to receive pulse information corresponding to electrical signals generated by non-targeted pixels, determine detected TOF hits, define a bounding box or an artefact box based on firing angle, pixel number, and distance of corresponding to the pulse information of the non-targeted pixels. The non-targeted scene processor 62 transmits the artefact box parameters to the crosstalk processing circuit 70. Thus, the non-targeted scene processing circuit 62 performs the first step of the three step approach described above (i.e., the detection and flagging step).

The crosstalk processing circuit 70 receives the detected TOF hits from the targeted scene processing circuit 61 and the artefact box parameters from the non-targeted scene processing circuit 62, and uses the received information to perform the second and third steps of the three step approach described above (i.e., the artefact probability scoring step and the probability thresholding step).

Based on the results of the probability thresholding step, the crosstalk processing circuit 70 transmits ToF data and possibly crosstalk information to a point cloud processing circuit 80 that is configured to generate point cloud data based thereon and output a point cloud.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A Light Detection and Ranging (LIDAR) system, comprising:
    a LIDAR transmitter configured to scan a field of view with a plurality of light beams, each of the plurality of light beams having an oblong shape that extends perpendicular to a scanning direction, the LIDAR transmitter comprising:
        a light source array comprising a plurality of light sources configured to generate a scanning light bar such that each of the plurality of light sources is configured to project into a different region of a plurality of regions of the field of view; and
        a controller configured to trigger a measurement of the field of view during which at least one targeted region of the field of view is illuminated by a single light beam generated by the light source array and at least one non-targeted region of the field of view is not illuminated by the light source array, wherein the single light beam is one of the plurality of light beams having the oblong shape; and
    a LIDAR receiver comprising:
        a photodetector array configured to receive at least one reflected light beam derived from the single light beam and generate electrical signals based on the at least one reflected light beam, wherein the photodetector array comprises a targeted pixel group that corresponds to the at least one targeted region of the field of view and a non-targeted pixel group that corresponds to the at least one non-targeted region of the field of view, wherein the targeted pixel group is defined by targeted pixels arranged according to the oblong shape of the single light beam and according to an expected receiving location corresponding to the single light beam; and an optical crosstalk detection circuit configured to receive at least one first electrical signal from the targeted pixel group responsive to the at least one reflected light beam and at least one second electrical signal from the non-targeted pixel group responsive to the at least one reflected light beam, detect optical crosstalk that appears at at least one portion of the non-targeted pixel group based on the at least one first electrical signal and the at least one second electrical signal, and define a glare artefact box corresponding to pixels of the photodetector array and defined by the detected optical crosstalk.

2. The LIDAR system of claim 1, wherein the optical crosstalk detection circuit is configured to define the glare artefact box based on at least one transmission angle, at least one pixel number, and at least one distance at which the optical crosstalk is detected.

3. The LIDAR system of claim 1, wherein:
the optical crosstalk detection circuit is further configured to read out an entire array of the photodetector array for a predetermined measurement period and detect optical crosstalk based on the electrical signals generated by the entire array during the predetermined measurement period, wherein the predetermined measurement period is limited to detecting the at least one reflected light beam that is derived from the single light beam.

4. The LIDAR system of claim 3, wherein the at least one second electrical signal includes a first time-of-flight (TOF) signal and a second TOF signal both generated by a first pixel of the photodetector array during the predetermined measurement period, wherein the first TOF signal has an earlier TOF than the second TOF signal and the optical crosstalk detection circuit is configured to determine that the optical crosstalk corresponds to the first TOF signal of the first pixel.

5. The LIDAR system of claim 1, wherein:
the optical crosstalk detection circuit is configured to measure a time-of-flight (TOF) corresponding to each of the at least one first electrical signal and the at least one second electrical signal, and detect the optical crosstalk at the at least one portion of the non-targeted pixel group based on the at least one first electrical signal and the at least one second electrical signal having a same TOF.

6. The LIDAR system of claim 1, wherein:
the optical crosstalk detection circuit is configured to measure an amplitude corresponding to each of the at least one first electrical signal and the at least one second electrical signal, and detect the optical crosstalk at the at least one portion of the non-targeted pixel group based on the amplitude of the at least one second electrical signal decreasing as a distance of the at least one portion of the non-targeted pixel group increases from the targeted pixel group.

7. The LIDAR system of claim 1, wherein the optical crosstalk detection circuit is configured to, in response to detecting the optical crosstalk, record a pixel number for each pixel of the non-targeted pixel group at which the optical crosstalk is detected.

8. The LIDAR system of claim 1, wherein the optical crosstalk detection circuit is configured to, in response to detecting the optical crosstalk, record a time-of-flight corresponding to the at least one reflected light beam for each pixel of the non-targeted pixel group at which the optical crosstalk is detected.

9. The LIDAR system of claim 1, wherein the optical crosstalk detection circuit is configured to, in response to detecting the optical crosstalk, record a transmission angle corresponding to the at least one reflected light beam for each pixel of the non-targeted pixel group at which the optical crosstalk is detected.

10. The LIDAR system of claim 1, wherein:
the plurality of regions include the at least one targeted region and the at least one non-targeted region, and
each of the plurality of regions extends from a first edge of the field of view to a second edge of the field of view opposite to the first edge.

11. The LIDAR system of claim 1, wherein the LIDAR transmitter further comprises:
a one-dimensional microelectromechanical systems (MEMS) oscillating structure configured to oscillate about a single scanning axis and reflectively transmit the plurality of light beams such that a scanning line moves across the field of view in the scanning direction as the one-dimensional MEMS oscillating structure oscillates about the single scanning axis.

12. The LIDAR system of claim 1, wherein:
the controller is configured to trigger a plurality of measurements of the field of view, wherein, over the plurality of measurements, the controller is configured to sequentially activate different first portions of the plurality of light sources corresponding to different targeted regions of the field of view while sequentially deactivating different second portions of the plurality of light sources corresponding to different non-targeted regions of the field of view, and
the optical crosstalk detection circuit is configured to detect at least one common glare artefact property between at least one of the different targeted regions and at least one of the different non-targeted regions, and detect optical crosstalk that appears at the at least one of the different non-targeted regions based on the at least one detected common glare artefact property.

13. The LIDAR system of claim 1, wherein:
the optical crosstalk detection circuit is configured to detect at least one common glare artefact property between the at least one first electrical signal and the at least one second electrical signal, and detect the optical crosstalk that appears at the at least one portion of the non-targeted pixel group based on the at least one detected common glare artefact property.

14. The LIDAR system of claim 1, wherein:
the optical crosstalk detection circuit is configured to assign a likelihood score to each of the electrical signals, including the at least one first electrical signal and the at least one second electrical signal, compare each likelihood score to a likelihood threshold, and identify the at least one portion of the non-targeted pixel group corresponding the at least one second electrical signal having a likelihood score less than the likelihood threshold.

15. The LIDAR system of claim 14, wherein:
the optical crosstalk detection circuit is configured to detect an optical crosstalk that appears at at least one portion of the targeted pixel group based on the at least one first electrical signal and the at least one second electrical signal, wherein the optical crosstalk detection circuit is configured identify the at least one portion of the targeted pixel group corresponding the at least one first electrical signal having a likelihood score less than the likelihood threshold.

16. The LIDAR system of claim 14, further comprising:
a point cloud generator configured to generate a point cloud based on the electrical signals,
wherein the optical crosstalk detection circuit is configured to report, to the point cloud generator, sensor data corresponding to the electrical signals having a likelihood score greater than the likelihood threshold, and
wherein the optical crosstalk detection circuit is configured to discard sensor data corresponding to the electrical signals having a likelihood score less than the likelihood threshold or report, to the point cloud generator, the sensor data corresponding to the electrical signals having the likelihood score less than the likelihood threshold along with a respective likelihood score.

17. A method of detecting optical crosstalk in a Light Detection and Ranging (LIDAR) system, the method comprising:
oscillating a one-dimensional microelectromechanical systems (MEMS) oscillating structure about a single axis such that light beams generated by a plurality of light sources of a linear light source array are projected at different transmission directions into a field of view;
selectively activating and deactivating the plurality of light sources, wherein each of the plurality of light sources is configured to project a light beam as a different segment of a scanning line into a corresponding region of a plurality of regions of the field of view;
triggering a measurement of the field of view during which at least one targeted region of the field of view is illuminated by the light source array with a single light beam and at least one non-targeted region of the field of view is not illuminated by the light source array;
generating electrical signals based on at least one reflected light beam derived from the single light beam and being received by a photodetector array, wherein the photodetector array comprises a targeted pixel group that corresponds to the at least one targeted region of the field of view and a non-targeted pixel group that corresponds to the at least one non-targeted region of the field of view, wherein the targeted pixel group is defined by targeted pixels arranged according to a shape of the single light beam and according to an expected receiving location corresponding to the single light beam;
processing at least one first electrical signal from the targeted pixel group responsive to the at least one reflected light beam;
processing at least one second electrical signal from the non-targeted pixel group responsive to the at least one reflected light beam;
detecting optical crosstalk that appears at at least one portion of the non-targeted pixel group based on the at least one first electrical signal and the at least one second electrical signal; and
defining a glare artefact box corresponding to pixels of the photodetector array and defined by the detected optical crosstalk,
wherein the glare artefact box is defined by the pixels of the photodetector array that generate electrical pulses at a first time-of-flight (TOF).

18. The method of claim 17, wherein defining the glare artefact box includes defining the glare artefact box based on at least one transmission angle, at least one pixel number, and at least one distance at which the optical crosstalk is detected.

19. The method of claim 17, further comprising:
detecting at least one common glare artefact property between the at least one first electrical signal and the at least one second electrical signal; and
detecting the optical crosstalk that appears at the at least one portion of the non-targeted pixel group based on the at least one detected common glare artefact property.

20. The method of claim 17, further comprising:
triggering a plurality of measurements of the field of view;
during the plurality of measurements, sequentially activating different first portions of the plurality of light sources corresponding to different targeted regions of the field of view while sequentially deactivating different second portions of the plurality of light sources corresponding to different non-targeted regions of the field of view;
detecting at least one common glare artefact property between at least one of the different targeted regions and at least one of the different non-targeted regions; and
detecting optical crosstalk that appears at the at least one of the different non-targeted regions based on the at least one detected common glare artefact property.

21. The method of claim 17, further comprising:
assigning a likelihood score to each of the electrical signals, including the at least one first electrical signal and the at least one second electrical signal;
comparing each likelihood score to a likelihood threshold; and
identifying the at least one portion of the non-targeted pixel group corresponding to the at least one second electrical signal having a likelihood score less than the likelihood threshold.

22. The method of claim 17, further comprising:
for the triggered measurement, reading out an entire portion of the of the photodetector array for a predetermined measurement period,
wherein the at least one second electrical signal includes a first time-of-flight (TOF) signal and a second TOF signal both generated by a first pixel of the photodetector array during the predetermined measurement period, wherein the first TOF signal has an earlier TOF than the second TOF signal, and
determining that the optical crosstalk corresponds to one of the first TOF signal or the second TOF signal of the first pixel.

23. The method of claim 17, further comprising:
measuring a time-of-flight (TOF) corresponding to each of the at least one first electrical signal and the at least one second electrical signal; and
detecting the optical crosstalk at the at least one portion of the non-targeted pixel group based on the at least one first electrical signal and the at least one second electrical signal having a same TOF.

24. The LIDAR system of claim 1, wherein the glare artefact box is defined by the pixels of the photodetector array that generate electrical pulses at a first time-of-flight (TOF).

25. The LIDAR system of claim 24, wherein the optical crosstalk detection circuit is configured to detect a pixel of the photodetector array corresponding to the glare artefact box that generates at least two electrical signals responsive to the at least one reflected light beam, the at least two electrical signals including a first TOF signal corresponding to the first TOF and a second TOF signal corresponding to a second TOF that is longer than the first TOF, and determine that the first TOF signal corresponds to the optical crosstalk.

26. The LIDAR system of claim 25, wherein the optical crosstalk detection circuit is configured to discard data of the first TOF signal corresponding to the optical crosstalk.

\* \* \* \* \*